US007246318B2

(12) United States Patent
Debique et al.

(10) Patent No.: US 7,246,318 B2
(45) Date of Patent: Jul. 17, 2007

(54) APPLICATION PROGRAMMING INTERFACE FOR UTILIZING MULTIMEDIA DATA

(75) Inventors: Kirt Debique, Seattle, WA (US); Rebecca C. Weiss, Kirkland, WA (US); Brian D. Crites, Sammamish, WA (US); Daniel J. Miller, Carnation, WA (US); Robin C. B. Speed, Kirkland, WA (US); Dong Wei, Bellevue, WA (US); Sohail B. Mohammed, Redmond, WA (US); Alexandre Grigorovitch, Redmond, WA (US); Geoffrey T. Dunbar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 855 days.

(21) Appl. No.: 10/185,161

(22) Filed: Jun. 28, 2002

(65) Prior Publication Data

US 2004/0004631 A1 Jan. 8, 2004

(51) Int. Cl.
*G06F 3/00* (2006.01)
(52) U.S. Cl. ........................ 715/734; 715/737; 709/231
(58) Field of Classification Search ................ 715/734, 715/738, 737; 709/250, 704, 219, 231
See application file for complete search history.

(56) References Cited

U.S. PATENT DOCUMENTS

| 5,956,729 | A | * | 9/1999 | Goetz et al. | .............. | 707/104.1 |
| 5,996,025 | A | | 11/1999 | Day et al. | .................... | 709/302 |
| 6,310,898 | B1 | * | 10/2001 | Schwartz | .................... | 370/537 |
| 6,683,649 | B1 | * | 1/2004 | Anderson | .............. | 348/333.05 |
| 2001/0029457 | A1 | * | 10/2001 | Shaffer et al. | .............. | 704/504 |
| 2002/0004855 | A1 | | 1/2002 | Cox et al. | .................... | 709/328 |
| 2002/0065952 | A1 | | 5/2002 | Sullivan et al. | .............. | 709/328 |
| 2003/0046437 | A1 | * | 3/2003 | Eytchison et al. | .......... | 709/250 |

OTHER PUBLICATIONS

Kaji, Masayo et al. "Creating Multimedia Presentation based on Constraint Satisfaction Problems in Multimedia Databases". Copyright 2000, Kobe University. pp. 143-151.*
Time-lined TCP for the TCP-friendly Delivery of Streaming Media, Biswaroop Mukherjee & Tim Brecht, Proceeding 2000 International Conference on Network Protocols, pp. 165-176.
Experiences in implementing a distributed object platform for multimedia applications, Geoff Coulson Shakuntala Baichoo, Software Practice & Experience, May 2000, vol. 30 No. 6, pp. 663-683.
A Distributed Object Platform for Multimedia Applications, Geoff Coulson and Shakuntala Baichoo, IEEE International Conference on Multimedia Computing and Systems, Jun. 1999, vol. 2 pp. 122-126.

* cited by examiner

*Primary Examiner*—Tadesse Hailu
*Assistant Examiner*—Michael Roswell
(74) *Attorney, Agent, or Firm*—Workman Nydegger (57) ABSTRACT

A computing system, which is in communication with a multimedia source and that includes at least one application for processing multimedia content from the multimedia source, includes an Application Programming Interface (API) for obtaining basic multimedia information that may be required by applications to process the multimedia content. By doing this, the invention enables multimedia application(s) to easily obtain the basic information from the API in a predetermined and standard manner, without having to obtain the information directly from the multimedia source, thereby reducing the functionality that has to be programmed directly into the application(s) for obtaining the basic information, and thereby reducing the cost, time, and resources that are required for creating the multimedia application(s).

34 Claims, 4 Drawing Sheets

APPLICATION PROGRAMMING INTERFACE FOR UTILIZING MULTIMEDIA DATA

BACKGROUND OF THE INVENTION

1. The Field of the Invention

The present invention is directed to methods, systems, and computer program products for accessing multimedia data of a variety of different formats from a variety of multimedia sources.

2. Related Technology

The advent of the computer revolution has had a tremendous impact on the ability to record and edit multimedia content (e.g., video and audio data). For instance, multimedia content can now be recorded in a digital format and stored on a condensed storage medium, thereby decreasing the cost and space previously required to archive desired multimedia content. Examples of condensed storage media that are capable of storing digital multimedia content include, for example, Compact Disks (CDs), Digital Video Disks (DVDs), MP3 disks, computer hard disk drives, floppy disks, smart media cards, and compact flash cards.

One advantage of digitizing multimedia content is that multimedia content can be broadcast and rendered with higher quality in a digital format than in an analog format. The devices and storage media used to capture and render digital multimedia are also typically smaller than the devices and storage media that are required to capture and render the same multimedia in analog formats. Yet another advantage of digitizing multimedia content is that digital data can typically be indexed and accessed more quickly than analog data.

The advantages provided by digitizing multimedia content have increased the demand for digital devices and multimedia applications that are capable of capturing, editing, and rendering multimedia content. Accordingly, the computer industry has worked to develop improved devices and applications to meet the increased demand.

One underlying problem with providing improved applications for multimedia content, however, is that there are many different types of formats, standards, and protocols that are used to encode and transmit digital data. Examples of different formatting standards include, for example, MPEG (Moving Picture Experts Group), ASF (Advanced Streaming Format), AVI (Audio Video Interleave), Active Movie, Cinepaq, QuickTime, Indeo, ATVEF (Advanced Television Enhancement Forum) and ATSC (Advanced Television Systems Committee).

Examples of different protocols and languages include RTSP (Real-Time Streaming Protocol), RTP (Real-Time Protocol), RTCP (Real-Time Control Protocol), UDP (User Datagram Protocol, HTTP (Hypertext Transport Protocol), MMS (Microsoft Media Server), TCP (Transmission Control Protocol), XML (eXtensible Markup Language), and SMIL (Synchronized Multimedia Integration Language).

There are also many different multimedia sources including, but not limited to, broadcast television stations, cable stations, radio stations, CDs, DVDs, computer hard drives, the Internet, MP3 players, and so forth. Each of these various multimedia sources may present multimedia content in a different manner to the multimedia application that is used to access and process the multimedia content, thereby requiring the multimedia applications to be configured to interpret a variety of different formats, standards and protocols.

Accordingly, the large variety of different multimedia formats, standards, and protocols creates a burden on programmers for creating multimedia applications that are capable of accommodating the various standards, protocols, languages and requirements that can be used to present multimedia content. Individually programming the multimedia applications in this manner, however, is inefficient, particularly when a single computing system is configured with multiple applications that must each be programmed to interpret certain basic information of the multimedia content. For instance, it may be necessary for the applications to each determine the duration of the multimedia content, the formatting of the multimedia content, the types of data present in the multimedia content, and so forth.

Programming each of the different applications to individually determine basic information regarding the multimedia content requires duplicated efforts and undesirably wastes time, costs, and resources that are required to individually program the multimedia applications. Accordingly, there is currently a need in the art for improved methods for enabling multimedia applications to access and process multimedia data without the applications having to individually interpret and determine the characteristics of the multimedia content directly.

BRIEF SUMMARY OF THE INVENTION

The present invention is primarily directed towards improved methods, systems and computer program products for facilitating the manner in which multimedia applications access and process multimedia data and, more particularly, for facilitating the manner in which applications obtain basic information regarding the multimedia data.

According to one embodiment of the invention, a computing system accesses at least one multimedia source having multimedia content so that the multimedia content can be processed by one or more applications that are associated with the computing system. The computing system may include, but is not limited to, a computer, a DVD player, and a programmable video recorder (PVR). The multimedia content may include, but is not limited to, audio and video data. In one example, the applications are configured to process the multimedia content in a predetermined manner, including, but not limited to, authoring, editing and playing the multimedia content.

According to one aspect of the invention, the applications obtain basic information regarding the multimedia source and multimedia content, which may be required to process the multimedia content, from a media source Application Programming Interface (API), rather than obtaining the basic information directly from the multimedia source(s). This generally reduces the programming requirements for creating multimedia applications. In particular, the applications do not have to be programmed with duplicative code for enabling each of the applications to interpret and obtain basic multimedia information, which may be presented in various formats. Instead, in accordance with the invention, the applications can easily obtain basic multimedia information in a standard and predetermined manner from the media source API, thereby simplifying the tasks that need to be performed by the applications to process the multimedia content.

According to one embodiment, basic information may include both format-agnostic data and format-specific data. Nevertheless, even though the media source API makes basic information available to the applications, it will be appreciated that certain applications can still be programmed to obtain the format-specific information by themselves.

Examples of basic multimedia information that may be obtained and made available by the media source API include, but are not limited to, the duration of a multimedia presentation, the duration of any individual stream in the presentation, the number of streams in the presentation, the media types supported by each stream, and the start and stop times associated with each stream in the presentation, as described below in more detail.

According to another aspect of the invention, the media source API is configured to manage one or more event queue tables in which multimedia source events and multimedia content events are queued. This enables the applications of the computing system to issue function calls to the media source API for events that are (or may become) queued in the event queue table. One benefit of the event queue is that a single function call may generate several events, therefore the event queue provides a means for deferring the processing of the events until the current call is complete. Typically the media source generates events, which are added to the event queue until they are processed. The events can be added to the queue at any time, even in the middle of processing an application.

Upon receiving an appropriate event request from an application, the media source API returns an object that is associated with the requested event to the requesting application. If a requested event is not queued, then the request remains pending until the event is queued. The objects that are returned to the applications may include, but are not limited to, basic information regarding the multimedia content, presentation information for presenting the multimedia content, commands for initiating a presentation, and commands for enabling control over how the multimedia content is presented, as described below in more detail. The control that is provided may be used to manage several media streams and several media types at the same time.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for facilitating the manner in which applications are able to access and process multimedia content originating from various multimedia sources. According to one aspect of the invention, a computing system includes an Application Programming Interface (API) that is configured to obtain basic information about the multimedia source(s) and the multimedia content contained therein.

Once the basic information is obtained, it is made available to any number of applications associated with the computing system through the inventive media source API. In this manner, the applications that understand the media source API can access and use the basic multimedia information to process the multimedia content, with little or no reprogramming that would otherwise be required to obtain the information directly from the multimedia source.

It will be appreciated by those or ordinary skill in the art (upon reading this description) that this can reduce the time, cost and resources that are otherwise required for creating multimedia applications. In particular, multimedia applications do not have to be programmed to interpret and obtain basic multimedia information directly from a multimedia source in the variety of different media formats in which the multimedia information may be presented.

The embodiments of the present invention may comprise a special purpose or general-purpose computer including various computer hardware, as described in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
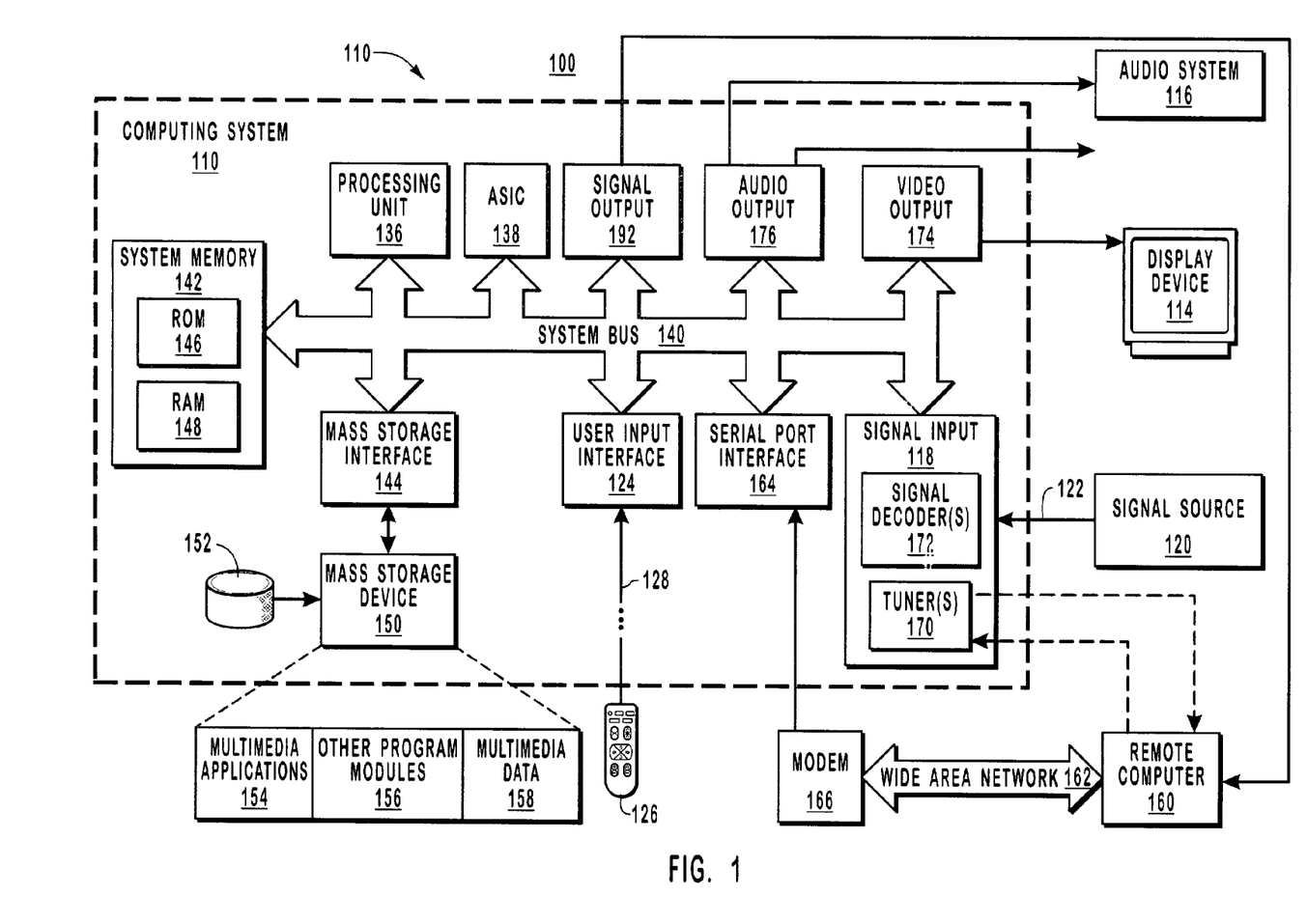
FIG. 1 illustrates one embodiment of a computing system in a network that may be used to practice methods of the invention.

FIG. 1 and the corresponding discussion provide a general description of a network 100 and a computing system 110 in which the present invention may operate. In one embodiment, the present invention is implemented in a network 100 that includes a computing system 110 that is associated with a multimedia rendering device, such as display device 114 and audio system 116. A remote computer 160 including other rendering devices may also be in communication with the computing system 110.

According to one embodiment, computing system 110 may be a computer, a PVR, a DVD player or any other device that has been adapted to perform the operations disclosed herein. The computing system may also be integrally positioned with or separate from display device 114, which may be a high definition television display, a standard television display, a flat panel display, a projection device, a high definition television display, a computer monitor, or any other device capable of displaying or otherwise processing viewable image data. Audio system 116 may be a speaker, a stereo system, or any other device capable of emitting sound data, and similarly may be integrally positioned with or separate from display device 114.

Computing system 110 includes a signal input 118, which receives multimedia data from a signal source 120. The multimedia data is transmitted from signal source 120 to signal input 118 via an input line 122, which can be a cable or optic connection, a terrestrial antenna system, a satellite system, or any device or system capable of transmitting multimedia data to computing system 110.

The signal source 120 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF, VHF, or ATVEF), and the like.

While FIG. 1 illustrates the computing system 110 as having a single programming input line 122 and a single signal source 120, there can instead be a plurality of programming input lines that transmit multimedia data from a plurality of signal sources. In such embodiments, the computing system 110 may receive the multimedia data from one signal source or from a plurality of signal sources at a time.

Computing system 110 also includes a user input interface 124, which receives input from an input device 126, such as a remote control, keyboard, microphone, or any other device capable of generating electronic instructions for computing system 110. Input device 126 is communicatively coupled to computing system 110 over an input link 128 so as to enable such control. Input device 126 generates electronic instructions over input link 128 in response to preprogrammed data or in response to a viewer pressing buttons on input device 126. Input device 126 may also control Web browser software within computing system 110 as when the computing system 110 receives multimedia data through an Internet connection.

The operation of the computing system 110 is controlled by a central processing unit ("CPU"), illustrated as processing unit 136, which is coupled to an application-specific integrated circuit ("ASIC") 138 and uses computer-executable instructions implemented in software and/or hardwired logic circuitry. Processing unit 136 and ASIC 138 are coupled via a system bus 140, which also interconnects various other system components, such as the system memory 142, mass storage interface 144, user interface 124 and signal input 118. Processing unit 136 executes software designed to implement features of computing system 110 including features of the present invention. ASIC 138 contains circuitry that is used to implement certain functions of the computing system 110. Instructions, data, and other software necessary for the operation of processing unit 136 and ASIC 138 may be stored in the system memory 142, such as in read-only memory ("ROM") 146 and/or in random-access memory ("RAM") 148, and/or in a mass storage device 150, which is coupled to mass storage interface 144. ROM 146, RAM 148 and mass storage device 150 are communicatively coupled to ASIC 138 so as to be readable by ASIC 138 and so that data may be written from ASIC 138 to RAM 148 and possibly mass storage device 150.

Mass storage device 150 may be a magnetic hard disk 152 or any other magnetic or optical mass memory device that is capable of storing large amounts of data. Any desired computer-readable instructions or data, including multimedia applications 154, other program modules 156, and multimedia data, such as audio and video data. According to the invention, multimedia data should be broadly construed in this application to also include markers, events, metadata and other data that is transmitted with corresponding audio and video data.

In the embodiment where the computing system 110 receives multimedia data from the Internet, computing system 110 communicates with a remote computer 160 via a wide area network ("WAN") 162 by including a serial port interface 164 that is interposed between the system bus 140 and a modem 166, a wireless link, or other means for establishing communications over a WAN that may be internal or external to computing system 110. Computing system 110 is also capable of transmitting information and receiving multimedia data via the Internet by direct-dial communication over standard telephone lines, or by using any other available communication medium.

Referring now to signal input 118, if the signal on programming input line 122 includes multiple channels that are each receiving different streams of data, a tuner 170 included in signal input 118 tunes to a selected channel in the signal. Multiple tuners 170 can be used to provide enhanced features, such as recording multimedia data from one channel while processing multimedia data on another channel. A signal decoder 172 converts video data from an analog format to a digital format, or from a digital format to an analog format, as necessary. Signal decoder 172 can also decode, decompress, and split audio, video, metadata and other data from a compressed stream format (e.g. MPEG, ASF). In embodiments where the computing system 110 includes multiple tuners 170, computing system 110 may also include multiple signal decoders 172 to perform the operations disclosed herein.

Computing system 110 also includes a video output 174 and an audio output 176 which are useful for transmitting data to rendering devices such as display device 114 and audio system 116. It will be appreciated, however, that the computing system 110 is not limited to transmitting data to local rendering devices. In particular, the computing system 110 can also transmit data to any number of remote computing devices, such as remote computer 160, which can be independently configured to process multimedia data that is stored in the mass storage device 150 of the computing system 110 and to transmit the multimedia data to other rendering devices. The remote computer 160 can directly receive the data from the computing system 110 via signal output 192 through a cable or optic connection, a terrestrial antenna system, a satellite system, or any other device or system capable of transmitting streamed data to the remote computer 160. Alternatively, the remote computer 160 can indirectly receive the data from the computing system 110 through the wide area network 162.

While FIG. 1 and the corresponding discussion above provide a general description of a suitable environment in which the invention may be implemented, it will be appreciated that the features of the present invention disclosed herein may be practiced in association with a variety of different system configurations.

Figure 2:
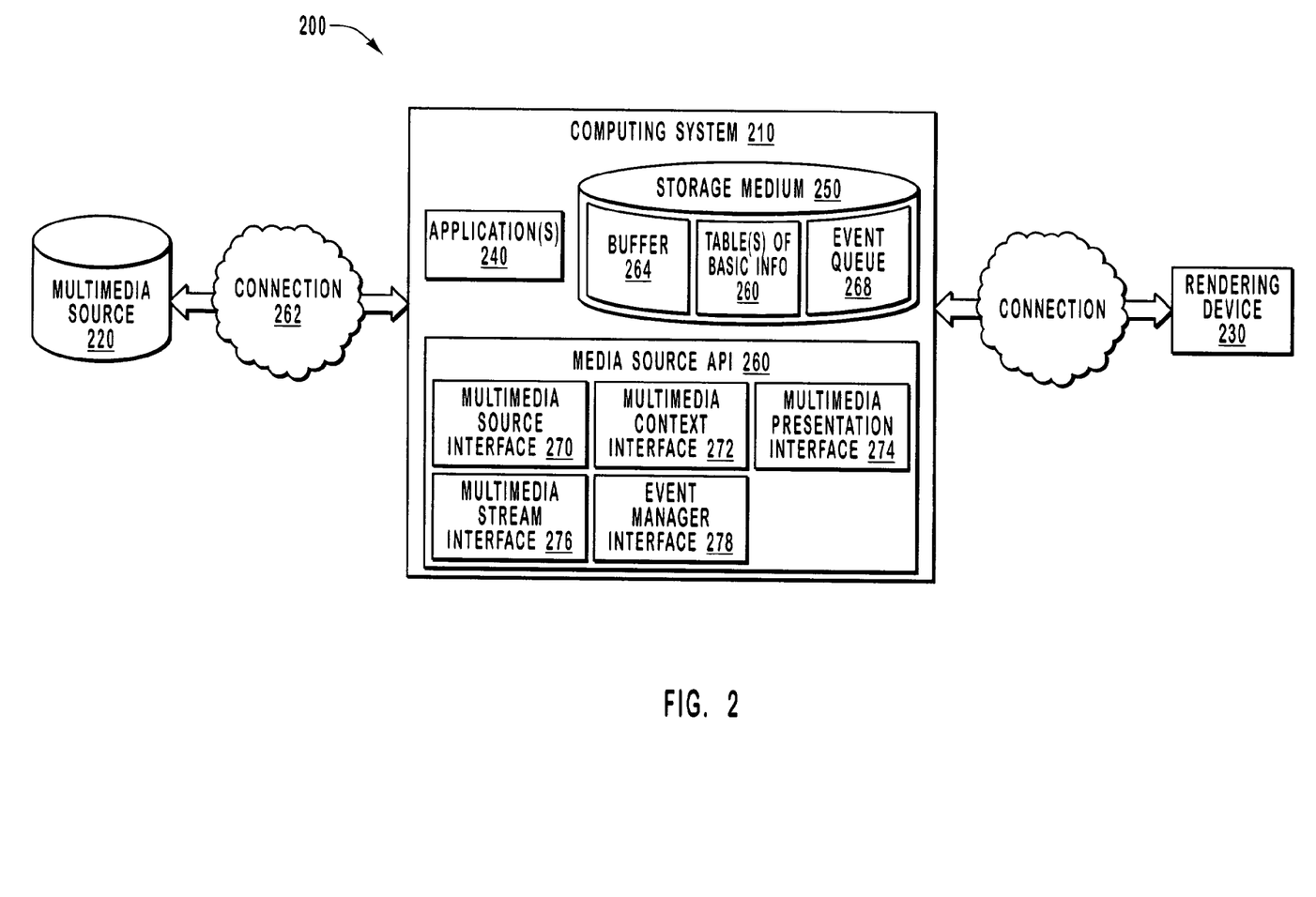
FIG. 2 illustrates one embodiment of an environment for practicing methods of the invention in which a computing system that includes an application, a storage medium, and a media source Application Programming Interface (API) is in communication with a multimedia source and a rendering device.

FIG. 2 illustrates one example environment 200 for practicing the methods of the invention that includes a computing system 210 that is in communication with a multimedia source 220 and a rendering device 230. As shown, the computing system 210 includes at least one application 240, a storage medium 250, and a media source API 260, each of which will now be discussed. The computing system 210 may be, for example, the computing system 110 of FIG. 1, although the invention is by no means limited to such a specific environment.

The application(s) 240 of the computing system 210 may include any application programs configured to process multimedia content received from the multimedia source 220. For example, the application(s) may be, multimedia applications 154 if the computing system 210 was, in fact, the computing system 110 of FIG. 1. The term "process" should be construed as any act or step performed on the multimedia data for enabling the multimedia data to be rendered, played, edited, or otherwise manipulated.

Examples of application(s) 240 include, but are not limited to the following: control applications for playing, pausing, seeking, and so forth; transforming applications for resampling, equalizing, amplifying, mixing, and so forth; and applications specifically associated with individual computer components like video cards, sound cards, CD ROM reading and writing drives, and so forth.

According to one embodiment of the invention, the computing system 210 accesses multimedia content from the multimedia source 220 through a connection 262, which may include, but is not limited to a cable or optic connection, a terrestrial antenna system, the Internet, and a satellite system.

As mentioned above, multimedia content (which is also referred to herein as multimedia data) can include audio and video data, as well as other data, such as meta-data, markers, events, and IP data, that are associated with the audio and video data. Multimedia content may be encoded according to a variety of standards and formats, including, but not limited to, MPEG, MP3, ASF, AVI, WMF, RTP, WAV, MIDI, Active Movie, Cinepaq, QuickTime, and Indeo.

Upon receiving multimedia content from the multimedia source 220, the computing system 210 stores the multimedia content in the storage medium 250. To facilitate methods of the invention, the storage medium 250 is configured with a buffer 264, tables of basic information 266, and an event queue 268, each of which is discussed in more detail below. The storage medium 250 abstractly represents any memory capability such as, for example, volatile memory, non-volatile memory, or combinations thereof.

During use, the application(s) 240 process the multimedia content which is stored in the storage medium 250. According to one embodiment, the manner in which the application(s) 240 may access and process the multimedia content is facilitated by the media source API 260. In particular, the media source API 260 includes several interfaces through which the application(s) 240 may obtain basic information regarding the multimedia content and the multimedia source that may be required to process the multimedia content.

According to one embodiment, the interfaces of the media source API 260 include a multimedia source interface 270, a multimedia content interface 272, a multimedia presentation interface 274, a multimedia stream interface 276, and an event manager interface 278, each of which will now be described.

The multimedia source interface 270 is configured to identify basic information or capabilities about the multimedia source, such as, for example, whether the multimedia source is push, pull or live, the bit rate ranges at which the multimedia source is capable of transmitting data, the formats in which the multimedia source is capable of transmitting the data, the capabilities provided or enabled by the multimedia source (e.g., seeking, pausing, and so forth), whether or not the multimedia source includes a clock for assigning and synchronizing the presentation of the multimedia content, and whether or not the multimedia source is capable of transmitting multiple data streams at a single time. This basic information is useful because the manner in which an application processes the multimedia content may depend on any of the foregoing multimedia source attributes or capabilities. These capabilities may be obtained without creating any implication that the multimedia content corresponds to a particular interface.

As a matter of example, it may be useful to know whether the multimedia source is a push, a pull or a live source to determine how the multimedia content is received. If the multimedia source is a push source (e.g., a streaming multimedia source), then the application(s) 240 may be notified of the rate in which the multimedia content is to be pulled or accepted from the multimedia source, otherwise data that is pushed or streamed by the multimedia source may be lost. If the multimedia source 220 is a live source, then the application(s) 240 may be given resource priority for accessing/processing the multimedia data. If the multimedia source 220 is a pull source, then the application(s) 240 may be made aware that new multimedia data will only be received when certain requests for the data are made. The application(s) 240 may also want to schedule calls for the multimedia content to be sure the multimedia is delivered and processed on time.

Determining the rate at which the multimedia source 220 is configured to transmit data 240 may also be important for determining when to make the buffer 264 in the storage medium 250 available to store the multimedia content. For example, when applications are unable to process data at the rate in which the multimedia content is received, the media source API may make the buffer 264 in the storage medium available so that the multimedia content may be stored until it can successfully be processed by the appropriate application(s) 240. Accordingly, in this manner the applications are effectively able to make calls for the buffer 264, thereby controlling the rate at which the multimedia data is received and stored.

The multimedia source interface 270 provides the application(s) with the appropriate information regarding the multimedia source 220 in a standard and uniform manner, without requiring each of the applications to be programmed in a duplicative manner to interpret the various formats in which the basic information may be presented to the computing system. Instead, according to the invention, the media source API obtains the information and makes it available to the application(s) 240 in a standard predetermined manner, such as, for example, by storing the basic information about the multimedia source in one or more table(s) of basic information 260 that are contained in the storage medium. The basic information about the multimedia source may also be presented immediately to the application(s) 240 without being placed in the storage medium.

The multimedia content interface 272 is configured to identify basic information about the multimedia content, such as, for example, the duration of each stream of multimedia data that is transmitted to the computing system 210, a unique identifier for each multimedia stream, the size of each multimedia stream, the start time and stop time assigned to each stream, and the available media types supported by each stream.

The duration of each stream may be provided in terms of nanoseconds or any other predetermined measurement of time. The unique identifier for each stream may be provided by the multimedia source or may be stored in the actual multimedia content or it may be synthesized by the media source API, and may include any symbol, name, letter, number or other unique identification mark.

The basic information about the multimedia content may also be made available to appropriate application(s) 240 by providing the information directly to the application(s) or by storing the basic information within the table(s) of basic information in the storage medium 266. According to one embodiment, the basic information is provided in the form of stream descriptor objects that are stored in the table(s) of basic information 266.

The basic information about the multimedia content may be required for an application to process the multimedia content. For instance, an application may need to know the available media types supported by each stream so that the application can request a media type that is desired by a user or that is compatible with the application. Examples of media types include, but are not limited to, image file types (e.g., JPEG, GIF, TIFF, and so forth), streaming formats (e.g., ASF, AVI, MPEG, MP3 and so forth), and sound file types (e.g., WAV, AU, MIDI, and so forth). The basic information about the multimedia content may also include the play languages and display options supported by the individual streams. This is useful, for example, for enabling an application to select a user desired language and display of a multimedia presentation, as described below.

The multimedia presentation interface 274 is configured to identify basic information about an intended presentation of the multimedia content. Examples of basic information about an intended presentation include, but are not limited to, metadata regarding an intended presentation, the duration of the intended presentation, the number of stream descriptor objects (described above), and which stream descriptor objects have been selected for the intended presentation.

The multimedia presentation interface 274 also determines the default or selected stream descriptor objects that are to be included in the multimedia presentation. For example, if the default stream descriptor indicates the intended presentation is to be rendered in the English language then this information is obtained so that the appropriate application configuration can be used to process the intended presentation in the English language.

The basic information about intended presentations may be stored in the storage medium, as a presentation object within the table(s) of basic information 266, so that they may be accessed by appropriate application(s) 240 when it is time to for the intended presentation to be rendered, or edited.

According to one embodiment, the multimedia stream interface 276 is configured to allow an application to access the multimedia content in a desired and controlled manner. For example, the multimedia stream interface 276 enables applications to select and deselect descriptor objects that are included in the presentation descriptor object. For example, if the multimedia source is a DVD that supports various languages and screen display formats, the multimedia presentation stream interface 276 enables the application to request a particular language and screen display format according to default settings preferred by the application, or according to user requests. According to one embodiment, the selection and deselection of descriptor objects occurs through function calls that are transmitted from the application to the multimedia source through the multimedia stream interface 276.

The multimedia stream interface 276 also enables applications to select desired play rates, to identify a desired output, such as rendering device 230, where the multimedia data should be transmitted during the presentation, the media type that is used of the available media types, when the buffer should be used to store multimedia content for enabling the multimedia content to be rendered at a later time, and for altering the play rate assigned to the presentation. When the multimedia content is not assigned time stamps by the multimedia source, the multimedia stream interface may be used to assign time stamps to the multimedia content.

The last illustrated interface of the media source API 260 is the event manager interface 278. The event manager interface 278 is configured to manage multimedia source events and multimedia content events that are received by the computing system by the multimedia source 220 and/or the application(s) 240. According to one embodiment, the multimedia source events and the multimedia content events are stored in an event queue 268 within the storage medium 250 of the computing system. Events are well understood by those skilled in the art. As described below in reference to FIG. 4, applications can request events from the one or more event queues, which may result in an object being transmitted to the requesting application. The events in the one or more event queues reference various resources, including the streams that they refer to. It will be appreciated that the event-based programming paradigm provided by the present invention for processing multimedia data via the one or more event queues is convenient and provides for the application to be truly responsive to external events.

Examples of multimedia content events and corresponding objects include, but are not limited to the following: events that indicate multimedia content has been received by the computing system, which may include the corresponding objects for identifying the location and attributes of the multimedia content; events indicating that a formatting change in the multimedia content has occurred, which may include the corresponding objects identifying the new format of the multimedia content; and other events, which may not have corresponding objects, such as events indicating the end of a stream, events indicating that a stream is being seeked, and events that specifying the time stamps associated with particular streams.

Examples of multimedia source events and corresponding objects include, but are not limited to the following: events that indicate a start, stop and pause of streaming multimedia content, which may have corresponding objects for activating and deactivating media streams of an intended presentation; events indicating the media source has been seeked for multimedia, which may include an object for identifying the time seeked to within the multimedia content; events indicating that a new presentation is available, which may include corresponding objects for starting the new presentation automatically or after the current presentation has ended; and events indicating a new stream is available in a current presentation, which may include corresponding objects for buffering the stream in the storage medium (for push media sources) or for notifying the application that a function call for the stream should be made when a current stream ends; events that indicate the end of a current presentation, which may include the corresponding objects for dropping all events from the queue that are related to the presentation; and events indicating that a current presentation has new metadata available, which may include the corresponding objects for refreshing the current metadata state associated with the presentation. Other media source events may not include corresponding objects, such as, but not limited to, events indicating data transmission rate changes in the media source.

Figure 3:
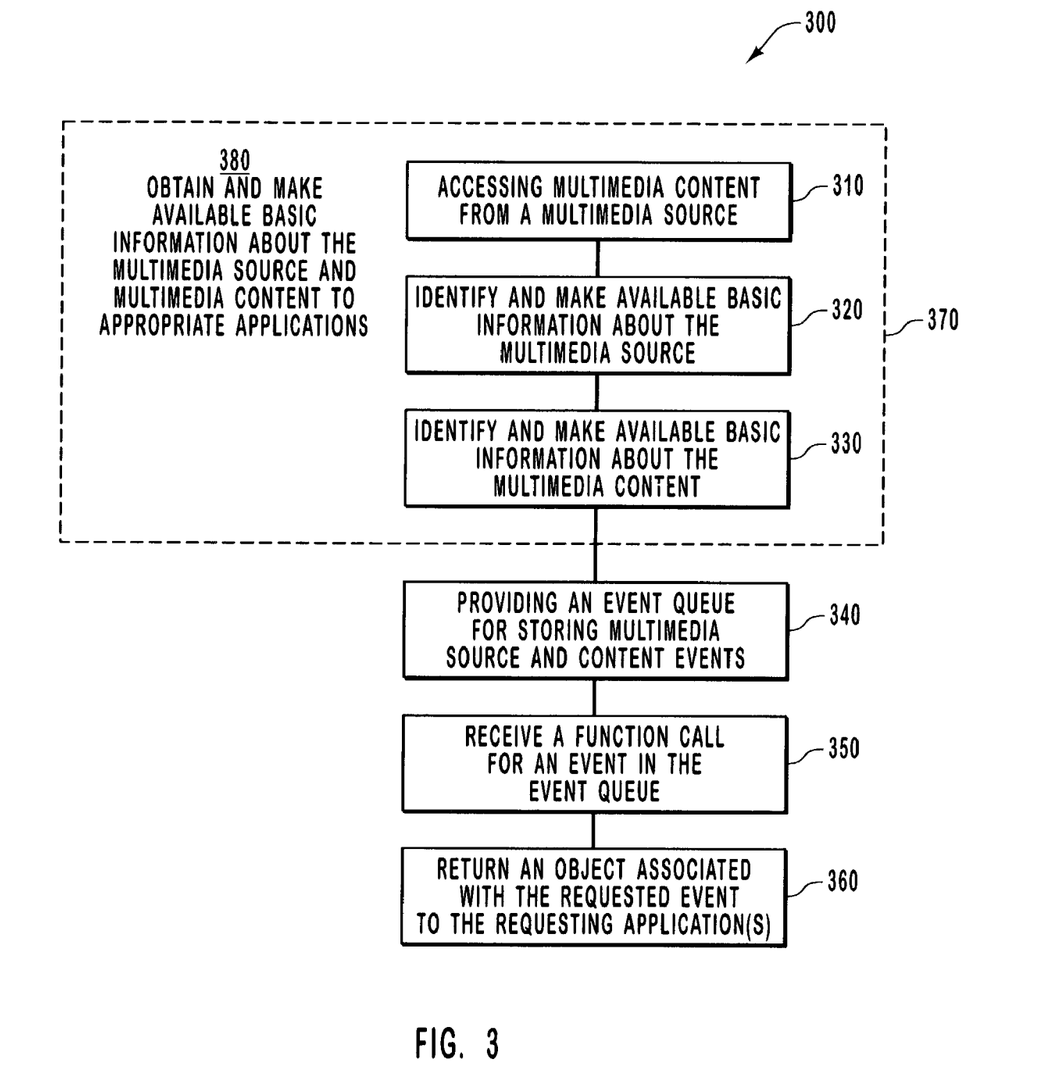
FIG. 3 illustrates a flow chart of one method for facilitating at least one application to access basic multimedia information and for facilitating how multimedia content is processed.

Turning now to FIG. 3, it is shown how the media source API 260 can help facilitate the manner in which applications obtain basic multimedia information according to one embodiment of the invention. As shown, the present method includes various acts that can be performed by the media source API 260. In particular, the media source API 260 is configured to access multimedia content from a multimedia source, (act 310), to identify and make available basic information about the multimedia source, (act 320), to identify and make available basic information about the multimedia content (act 330), to provide an event queue for storing multimedia source and content events (act 340), to receive function calls for events in the event queue (act 350), and to return the corresponding objects that are associated with the requested events to the requesting application(s) (act 360). In this manner, the media source API is effectively able to provide a means for the application(s) to stop, pause, and start streaming multimedia data.

As indicated by the dotted line 370, the acts of accessing the multimedia content and making available basic information about the multimedia source and content (acts 310, 320, 330) can be generally described as a single step for obtaining and making available basic information about the multimedia source and multimedia content to appropriate applications (step 380). Accordingly, step 380 should be interpreted in terms of the corresponding acts 310, 320, 330 and equivalents thereof.

As described above, the act of accessing multimedia content from a multimedia source (act 310) may occur in a push a pull or a live communication. The acts of identifying and making available the basic information about the multimedia source and content (acts 320 and 330) can occur when the computing system uses the API to obtain the basic information and either transmits the basic information directly to one or more application(s) and stores the basic information in a storage medium to be accessed by one or more applications.

The act of providing an event queue for storing events (act 340) may occur directly by formatting designated memory to store events, or indirectly by simply transmitting the events to a preformatted portion of designated memory. The designated memory may include the system memory of the computing system or any other local or remote memory that is volatile or non-volatile. In one embodiment, the act of providing an event queue includes the act of providing more than one event queue.

The act of receiving a function call for an event (act 350) may occur passively, by waiting until an application initiates a request for an event. Alternatively, the act of receiving a function call for an event (act 350) may occur actively by notifying one or more applications that an event has been queued and is ready to be requested. This alternative enables the media source API to operate as a pull system without superseding the control of the applications. For example, when a new media stream has been received or is detected, the media source API can queue the event indicating the new media stream while at the same time notifying applications that the new media stream is ready to be processed. This enables the applications to issue a function call for the event so that an appropriate and corresponding object can be returned (act 360), which may result in the playing of the new media stream.

Figure 4:
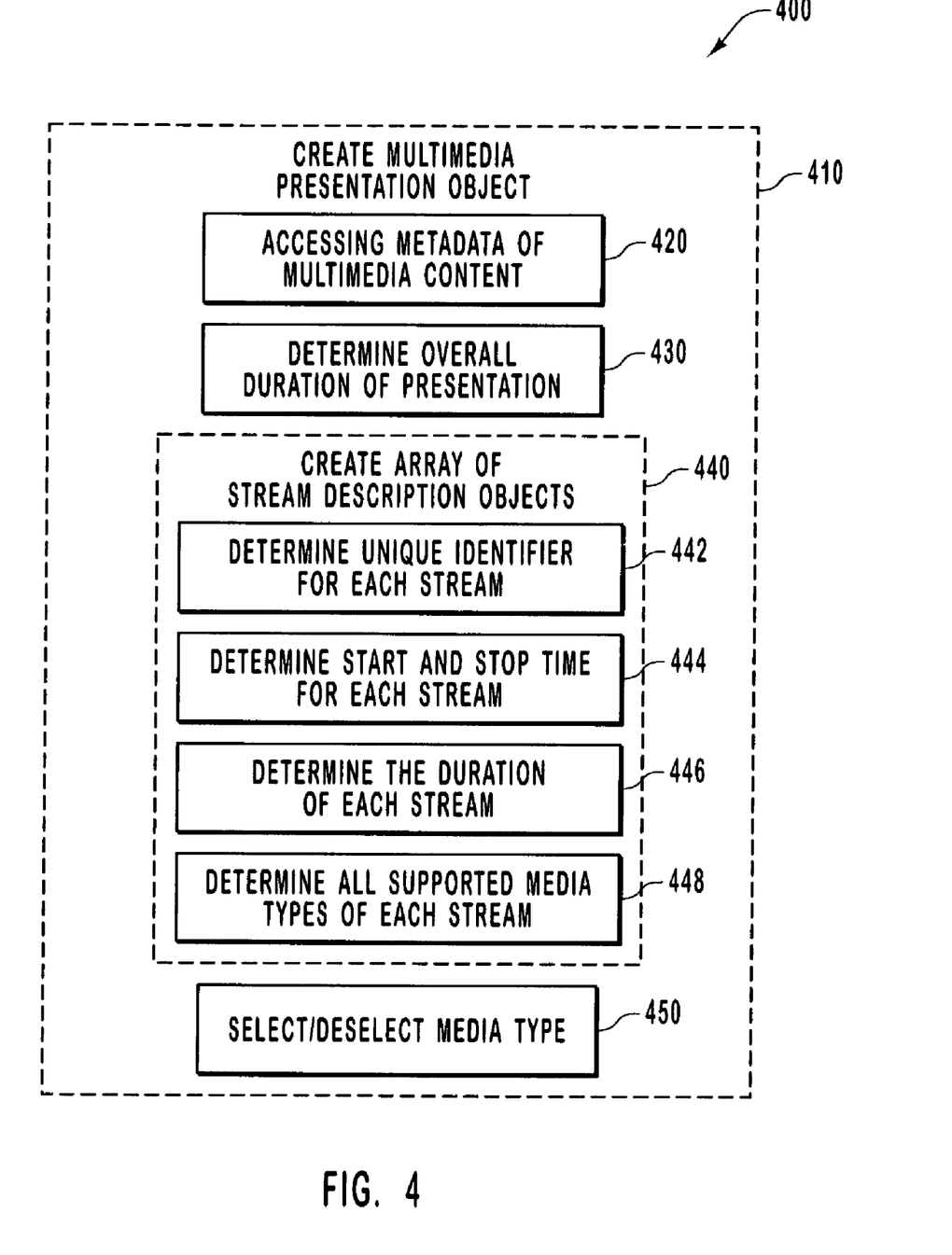
FIG. 4 illustrates a flow chart of one method in which the media source API of FIG. 2 is used to create a multimedia presentation object.

FIG. 4 illustrates a flow chart of one method 400 which is performed by the media source API 260, of FIG. 2, for facilitating the how multimedia applications access and process multimedia data and which includes the step for creating a multimedia presentation object (step 410). Multimedia presentation objects, as described above, contain information that may facilitate the manner in which application(s) are able to processes multimedia content, such as, for example, to play a multimedia presentation (e.g., a DVD movie).

The corresponding acts and step for creating a multimedia presentation object (step 410) include the acts of determining the multimedia content metadata that applies to the presentation. In general, the metadata of the multimedia content provides information on how the multimedia content is formatted, which is used to interpret and process the multimedia content. The next act includes determining the overall duration of the presentation (act 430). Although not necessary, act (430) may be useful for synchronizing the time stamps of different media streams that are to be rendered simultaneously, for example. Synchronization may also occur with the use of the timestamps assigned to each sample from each of the media streams.

Next, the method 400 includes the step for creating an array of stream descriptor objects, which are described above. The corresponding acts for creating the stream descriptor objects (step 440) include the acts of determining unique identifiers for each stream (act 442), determining the start and stop time for each stream (act 444), determining the duration of each stream (act 446), and determining all supported media types of each stream (448).

Upon creating the array of stream descriptor objects (step 440), which are made available to the applications, as described above, the step for creating the multimedia presentation object (step 410) may further include the act of selecting a preferred media type in which the presentation is to be rendered.

Upon creating a multimedia presentation object, the media source API queues an event in the event queue that a new presentation is ready. Thereafter, one or more applications issue a function call for the new presentation event, which causes the media source API to return the newly created media presentation object to the requesting application(s). Upon receiving the multimedia presentation object, which includes the array of stream descriptor objects, the applications are able to activate the appropriate streams of the presentation at the appropriate times.

During the presentation, when a buffer is required by one or more applications to buffer activated media streams then the buffer is presented (act 460) by the media source API to the one or more applications. In one embodiment, the applications themselves allocate space for the buffer and the media source API fills the buffer with the multimedia data. In another embodiment, the media source API allocates space for the buffer and fills the buffer with the multimedia data. The media source API also enables the applications to pause, stop, and seek multimedia content during the presentation, when the media source allows this functionality. In some circumstances, for example, the media source may not allow pausing of a live presentation.

As events are received during the presentation, the media source API continues to queue the events and respond to requests for the events. For instance, when the events that indicate a current media stream has ended and that a new media stream is available are received by the media source APT, the media source API notifies the appropriate applications and waits until a request for the new media stream is received in the form of a function call for the queued event. Then, as indicated in FIG. 3, when the application provides an appropriate function call for the newly received media stream event then an object associated with the requested event is returned to the application, thereby enabling the new media stream to be activated.

Although the acts shown in FIGS. 3 and 4 are shown serially, it will be appreciated that the acts may also be performed in different orders and sequences. By way of example, and not limitation, the acts of providing an event queue (act 340), receiving a function call for an event (act 350) and accessing multimedia content (310), may occur simultaneously.

In summary, the methods of the invention enable an API to obtain basic multimedia information that may be required to process multimedia data. By doing this, the invention enables one or more applications to easily obtain the basic information from the API in a predetermined and standard manner, without having to individually obtain the information directly from the multimedia source.

It will be appreciated by one skilled in the art upon reading this application that this invention is particularly useful for reducing the functionality that has to be programmed into multimedia applications, thereby reducing the burden (e.g., cost, time, and resources) required for creating new multimedia applications.

Code that may be used for creating some of the interfaces that are described herein will now be described. Nevertheless, while specific code is provided below, it will be appreciated by one of ordinary skill in the art, after having reviewed this description, that there are many software implementations that fall within the scope of the present invention. Accordingly, the code provided below exhibits only possible embodiments for implementing the methods of the invention, and are provided by way of illustration only, and not to limit the scope of the invention. Accordingly, any number of the interfaces described herein may be integrated and combined into modules, computer program products, and other interfaces for implementing methods of the invention.

According to one embodiment, the multimedia source interface 270 may include the following IMFMediaEventGenerator interface code:

```
Interface IMFMediaSource : IMFMediaEventGenerator
{
    DWORD GetCharacteristics( );
    HRESULT GetService(
        [in] REFGUID guidService,
        [in] REFIID riid,
        [out] IUnknown ** ppunkObject
        );
    HRESULT GetDefaultPresentation(
        [in] DWORD cMajorTypeFilter,
        [in] const GUID** aMajorTypeFilter,
        [out] IMFMediaPresentation** ppPresentation
        );
    HRESULT Start(
        [in] IMFMediaPresentation* pPresentation
        );
    HRESULT Stop( );
    HRESULT Pause( );
    HRESULT Seek(
        [in] IMFMediaPresentation* pPresentation,
        [in] const GUID* pguidTimeFormat,
        [in] IMFStreamDescriptor* pMasterStream,
        [in] LONGLONG llTime
        );
    HRESULT GetClock(
        [out] IMFClock** ppClock
        );
    HRESULT GetActivePresentation(
        [out] IMFMediaPresentation** ppPresentation
        );
};
```

In the foregoing code, GetCharacteristics returns flags indicating interesting characteristics of the media source. For example, the certain flags may be defined as follows for describing characteristics of the media source:

```
// Indicate that this is a live source
#define MEDIASOURCE_IS_LIVE                        0x00000001
// Indicate that this is a push mode source
#define MEDIASOURCE_IS_PUSH_MODE                   0x00000002
// Indicate that this source exposes a rate control service
#define MEDIASOURCE_HAS_RATE_CONTROL               0x00000004
// Indicate that this source exposes a stream selector service
#define MEDIASOURCE_HAS_STREAM_SELECTOR            0x00000008
// Indicate that this source exposed uncompressed formats in its current presentation
#define MEDIASOURCE_HAS_UNCOMPRESSED_FORMATS       0x00000010
// Indicate that this source can seek
#define MEDIASOURCE_CAN_SEEK                       0x00000020
// Indicate this this source can pause
#define MEDIASOURCE_CAN_PAUSE                      0x00000040
```

```
// Indicate that this source can process multiple samples per ::ProcessBuffer call
// on a stream
#define MEDIASOURCE_CAN_PROCESS_MULTIPLE_SAMPLES    0x00000080
// Indicate that this source can drop samples if the caller does not
// supply buffers fast enough or if the source is paused
#define MEDIASOURCE_CAN_DROP_SAMPLES                0x00000100
```

GetService allows the calling application to retrieve extended services from the media source, such as MS_RATE_CONTROL_SERVICE (supported by IID_IMFMediaSourceRateControl interface), and MS_STREAM_SELECTOR_SERVICE (supported by IID_IMFStreamSelector interface).

GetDefaultPresentation creates and returns a default presentation object describing the content initialized on the media source, including a default set of media streams.

"Start" activates the media source with the presentation that is specified by the pPresentation input parameter. If the pPresentation input parameter is NULL, and the media source is in the stopped state, the default presentation is used to active the media source streams. If the media source is in a paused state, the currently active presentation is started. If a new presentation is started on a source which already has an active presentation, then at the time the new ME_MEDIA_SOURCE_STARTED event is queued, all prior active media streams objects are shutdown.

"Stop" terminates all active streams in the media source. "Pause" pauses all active streams in the media source. "Seek" allows the media source to be seeked to a specified time. The pPresentation input parameter is used to specify the presentation on which the seek is being performed. If the pPresentation parameter is NULL, then the seek is performed on the current active presentation. If the parameter is non NULL, the presentation being seeked becomes the current active presentation and the presentation is started. The format of the specified time is indicated by the pguidTimeFormat input parameter and is in the format of 100 ns when the pguidTimeFormat input parameter is NULL. The pMasterStream parameter is used when the time format is applied in the context of a particular media stream, e.g., seek to frame.

GetClock returns the clock associated with the media source, if one is available. The clock is returned as an IMFClock which is defined according to Microsoft's Media Foundation.

GetActivePresentation returns the currently active media presentation.

The Media Source Events, which are described above in reference to FIG. 3, are associated with corresponding objects that are returned when the media source events are requested by a calling application. Generally, media source objects enable manipulation of particular pieces of the multimedia. For example, they may expose retrieval of the presentation, generate media events, expose source control (start, stop, pause, and so forth, and enable other services, as described above.

The multimedia content interface 272 may include the following IMFStreamDescriptor interface code:

```
Interface IMFStreamDescriptor : IUnknown
{
    DWORD GetStreamIdentifier( );
    LONGLONG GetDuration( );
```

```
    HRESULT GetStartTime(
        [in] const GUID* pguidTimeFormat,
        [out] LONGLONG* p11StartTime
        );
    HRESULT GetStopTime(
        [in] const GUID* pguidTimeFormat,
        [out] LONGLONG* p11StopTime
        );
    DWORD GetMediaTypeCount( );
    HRESULT GetMediaTypeByIndex(
        [in] DWORD dwIndex,
        [out] IMFMediaType** ppType
        );
    HRESULT Clone(
        [out] IMFStreamDescriptor** ppDescriptor
        );
};
```

In the foregoing code, GetStreamIdentifier returns a unique identifier for the stream that is received from the multimedia source. GetStartTime returns the start time of the stream and GetStopTime returns the stop time of the stream, both relative to the media source in the time format requested by a calling application via the input parameter guidTimeFormat. A NULL pointer as the time format requests the standard time format of 100 ns units. GetMediaTypeCount returns the count of media types available on the media stream. GetMediaTypeByIndex returns a media type given an input dwIndex parameter which is valid in the range 0 to media type count −1. The media type is returned as an IMFMediaType object defined according to Microsoft's Media Foundation. "Clone" makes a deep copy of the stream descriptor object.

The multimedia content interface 272 may also include the following code for allowing a media source to create a stream descriptor object that is initialized with a set of parameters, including media types, stream times, and so forth:

```
HRESULT MFCreateStreamDescriptor(
    [in] DWORD dwStreamIdentifier,
    [in] DWORD dwStreamIdentifier,
    [in] DWORD cStreamTimes,
    [in] const GUID** apguidTimeFormats,
    [in] LONGLONG* aStartTimes,
    [in] LONGLONG* aStopTimes,
    [in] DWORD cMediaTypes,
    [in] IMFMediaType** apMediaTypes,
    [out] IMFStreamDescriptor** ppDescriptor
    );
```

The foregoing code includes various parameters, including the following: dwStreamIdentifier, which is the identifier for the stream; cStreamTimes, which is the count of supported stream time formats; apguidTimeFormats, which is the array of supported time format GUIDs; aStartTime, which is the array of start times for the stream that corresponds to the count of supported stream time formats;

aStopTimes, which is the array of stop times corresponding to the count of supported stream time formats; cMediaTypes, which is the count of media types supported by the stream; apMediaTypes, which is the array of media types supported by the stream; and ppPresentation, which is the location to output the presentation object pointer.

The multimedia presentation interface 274 may include the following IMFMediaPresentation interface code:

```
Interface IMFMediaPresentation : IUnknown
{
        HRESULT GetMetadata(
                [in] REFIID riid,
                [out] IUnknown** ppunkObject
                );
        HRESULT GetDuration(
                [in] const GUID* pguidTimeFormat,
                [out] LONGLONG* p11Duration
                );
        DWORD GetStreamDescriptorCount( );
        HRESULT GetStreamDescriptorByIndex(
                [in] DWORD dwIndex,
                [out] BOOL* pfSelected,
                [out] DWORD* pdwSelectionFlags,
                [out] IMFStreamDescriptor** ppStreamDescriptor
                [out] IMFMediaType** ppSelectedMediaType
                );
        HRESULT SelectStream(
                [in] DWORD dwDescriptorIndex,
                [in] DWORD dwSelectionFlags,
            [in] IMFMediaType* pSelectedMediaType
                );
        HRESULT DeselectStream(
                [in] DWORD dwDescriptorIndex
                );
        HRESULT Clone(
                [out] IMFMediaPresentation** ppPresentation
                );
};
```

In the foregoing code, GetMetadata retrieves a metadata management interface that provides access to the overall content and metadata of the presentation. GetDuration returns the duration of the presentation. If a null pointer is pointer is specified, the duration returned is in the default time format of 100 ns units. GetStreamDescriptorCount returns the count of stream descriptor objects in the presentation, wherein each stream descriptor object describes a stream in the media presentation. GetStreamDescriptorByIndex retrieves the stream descriptors in the presentation associated with the index specified by the dwIndex input parameter. pfStselected indicates whether the stream is selected in the presentation so that it can be activated. ppSelectedMediaType indicates the media type that is selected for the stream in the presentation, which is derived from the set of supported stream media types.

SelectStream allows an application to select a stream in the presentation by providing a stream selection flag (indicated by dwSelectionFlags) and a selected media type. DeselectStream allows the application to deselect a stream in the presentation. "Clone" causes a copy of all stream descriptors and associated information to be made.

The multimedia presentation interface 274 may also include the following code for allowing a source to create a media presentation object that is initialized with a set of stream descriptors, medadata, and so forth:

```
        HRESULT MFCreatePresentation(
                [in] IUnknown* punkMetadata,
                [in] LONGLONG 11Duration,
```

-continued

```
                [in] DWORD cStreamDescriptors,
                [in] IMFStreamDescriptor** aStreamDescriptors
                [out] IMFMediaPresentation** ppPresentation
                );
```

The parameters of the foregoing code include the following: punkMetadata, which is the metadata object to be associated with the presentation; llDuration, which is the length of the presentation in 100 ns interval units; cStreamDescriptor, which is the number of stream descriptors in the presentation; aStreamDescriptors, which is the array of stream descriptors to be associated with the presentation; and ppPresentation, which is the location to output the presentation object pointer.

The multimedia stream interface 276 may be associated with the IMFMediaSource interface code, described above, and may further include the following IMFMediaStream interface code:

```
Interface IMFMediaStream : IMFMediaEventGenerator
{
        HRESULT GetMediaSource(
                [out] IMFMediaSource** ppMediaSource
                );
        HRESULT GetStreamDescriptor(
                [out] IMFStreamDescriptor** ppDescriptor
                );
        HRESULT GetCurrentMediaType(
                [out] IMFMediaType** ppMediaType
                );
        HRESULT SetCurrentMediaType(
                [in] IMFMediaType* pMediaType
                );
        BOOL IsEndOfStream( );
        HRESULT ProcessBuffer(
                [in] IMediaBuffer* pBuffer
                );
        HRESULT Shutdown( );
};
```

In the foregoing code, GetMediaSource returns the media source object to which the stream belongs. GetStreamDescriptor returns the stream descriptor object used to activate the stream. GetCurrentMediaType returns the current media type configured on the active stream. SetCurrentMediaType allows the application to set a new current media type for the output of the multimedia. IsEndOfStream returns TRUE if all events for the stream have been emptied from the queue, otherwise it returns false.

ProcessBuffer presents a buffer to the media stream so it can deliver a sample into the media stream queue via an event. The buffer is presented as an ImediaBuffer via the pBuffer input parameter defined according to Microsoft's Media Foundation. If the application would like the media stream to use its own samples, rather than the buffer's, it may still call ProcessBuffer (to maintain flow control), while designating ProcessBuffer to NULL.

"Shutdown" is used to explicitly shutdown a media stream object prior to releasing it. The application calls this method when it is through with the stream. The implementation of shutdown releases waiting event generators (GetEvent, BeginEvent), destroys the queued events, and releases any references to the corresponding source objects. Shutdown may also shutdown any other resources it deems appropriate.

The multimedia stream interface may also be associated with the following IMFMediaStreamArray interface code:

```
Interface IMFMediaStreamArray : IUnknown
{
    DWORD GetMediaStreamCount( );
    HRESULT GetMediaStreamByIndex(
        [in] DWORD dwIndex,
        [out] IMFMediaStream** ppMediaStream
    );
}
```

In the foregoing code, GetMediaStreamCount returns the count of media stream objects in the array and GetMediaStreamByIndex returns the media stream associated with the index specified by the dwIndex input parameter.

The multimedia stream interface may also be associated with the following IMFMediaStreamSelector interface code:

```
Interface IMFStreamSelector : IUnknown
{
    HRESULT SelectStreams(
        [in] IMFMediaPresentation* pPresentation,
        [in] DWORD dwFlags,
        [in] DWORD dwBitrate,
        [in] LPWSTR pwszLanguage
    );
    HRESULT GetOutputIdentifierFromStreamIdentifier(
        [in] DWORD dwStreamIdentifier,
        [out] DWORD* pdwOutputIdentifier
    );
};
```

In the foregoing code, SelectStreams selects the streams in the presentation that are matched by the media source specific automatic stream selection logic given in the input bitrate (dwBitrate) and language (pwszLanguage) specifiers. GetOutputIdentifierFromStreamIdentifier returns the output identifier that a particular selected stream is associated with, such that the application can map newly selected streams to the same rendering output, where appropriate.

The following flags may also be used to modify the stream selection process:

```
// Use the lowest bitrate streams (dwBitrate must be zero)
#define MFSTREAMSELECT_FLAG_USE_LOWEST_BITRATE_STREAMS 0x00000001
// Use the highest bitrate streams (dwBitrate must be zero)
#define MFSTREAMSELECT_FLAG_USE_HIGHEST_BITRATE_STREAMS 0x00000002
// Use the default language stream (pwszLanguage must be NULL)
#define MFSTREAMSELECT_FLAG_USE_DEFAULT_LANGUAGE_STREAMS 0x00000004
```

The multimedia stream interface may also be associated with the following IMFMediaSourceRateControl interface code:

```
Interface IMFMediaSourceRateControl : IUnknown
{
    float GetMinRate( );
    float GetMaxRate( );
    float GetCurrentRate( );
```

-continued

```
    HRESULT SetRate(
        [in] float fRate
    );
};
```

In the foregoing code, GetMinRate returns the minimum possible rate that can be set on the media source. GetMaxRate returns the maximum possible rate that can be set on the media source. GetCurrentRate returns the current rate of the media source. SetRate changes the rate of the media source. In one embodiment, the normal rate is set at 1.0 on the rate control interface. All other rates are multipliers of the normal rate (e.g., 2.0 is twice as fast as normal). The rate change can be changed when the media source is in the started or stopped states.

The IMFMediaSourceRateControl interface code may be optionally implemented by media source objects to expose their own rate control, such as, for example, when a networked streaming source sends a rate change message to the server to only send key frames.

The event manager interface 278 may include the following IMFMedia Event interface source code:

```
interface IMFMediaEvent : IUnknown
{
    HRESULT GetType(
        [out] GUID* pguidType
    );
    HRESULT GetStatus( );
    HRESULT GetDataObject(
        [out] IUnknown** ppunkObject
    );
};
```

In the foregoing source code, GetType returns the event type for a requested event. GetStatus returns the status of a specified event as an HRESULT. GetDataObject returns an object associated with the requested media event. Event types and event objects are described above in reference to FIG. 3.

The event manager interface 278 may also include the following IMFMediaEventGenerator interface source code:

```
Interface IMFMediaEventGenerator : IUnknown
{
    HRESULT GetEvent(
        [in] DWORD dwFlags,
        [out] IMFMediaEvent** ppEvent
    );
```

```
          HRESULT BeginGetEvent(
              [in] IMFAsyncCallback* pCallback,
              [in] IUnknown* punkState
              );
          HRESULT EndGetEvent(
              [in] IMFAsyncResult* pResult,
              [out] IMFMediaEvent** ppEvent
              );
    }
```

In the foregoing code, GetEvent allows the caller to synchronously retrieve the next event available in the event queue. If dwFlags is zero, then the function blocks until an event is available to return from the queue. BeginGetEvent allows the caller to start an asynchronous request for an event. EndGetEvent allows the calling application to retrieve the media event object associated with a prior BeginGetEvent request.

During use, an application may make a call to BeginGetEvent with the following:

```
//
// The callback parameter is an IMFAsyncCallback which is
// implemented by the application.
//
// The state parameter is NULL since the app doesn't want any
// extra state variable passed to it in the callback invocation
//
m_pSource->BeginGetEvent( pCallback, NULL );
```

The application callback is then invoked when an event is queued. The following source code may be used to actually retrieve the associated event:

```
STDMETHODIMP CAppCallback::Invoke(IMFAsyncResult* pResult)
{
    HRESULT    hr;
    IMFMediaEvent* pEvent = NULL;
    hr = m_pSource->EndGetEvent( pResult, &pEvent );
    // further processing of the event can go here
    hr = OnSourceEvent( pEvent );
    // more event processing
    return( hr );
}
```

In order to get more events, the application may need to call BeginGetEvent again. However, according to another embodiment, multiple events can be processed with the following code:

```
HRESULT CApp::OnAsyncEvent(IMFAsyncResult* pResult)
{
    HRESULT    hr;
    IMFMediaEvent* pEvent = NULL;
    BOOL       fContinue = TRUE;
    // If you pass in NULL for the pResult, then this all
    // boils down to BeginGetEvent
    // Otherwise, it retrieves the next event via EndGetEvent
    // processes it, and if it should continue, it calls
    // BeginGetEvent
    if( NULL != pResult)
    {
        hr = m_pSource->EndGetEvent( pResult, &pEvent );
    }
    if( NULL != pEvent )
    {
        hr = OnSourceEvent( pEvent, &fContinue );
    }
    if( fContinue )
    {
        hr = m_pSource->BeginGetEvent( m_pCallback, NULL );
    }
    return( hr );
}
HRESULT CAppCallback::Invoke(IMFAsyncResult* pResult)
{
    HRESULT hr;
    hr = m_pApp->OnAsyncEvent( pResult );
    return( hr );
}
```

The foregoing code illustrates certain specific embodiments of source code and program interfaces that may be used according to the present invention for facilitating the manner in which multimedia data is accessed and processed by multimedia applications.

It will be appreciated, however, that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that is associated with at least one application configured to process multimedia content that includes one or more streams of content from a multimedia source, a method for facilitating the at least one application to process the multimedia content by identifying and providing the application with basic multimedia source and content information, such that the at least one application does not have to be programmed to identify the basic information directly from the multimedia source, the method comprising:

an act of accessing multimedia content from the multimedia source to be rendered in a presentation;

an act of using multimedia interfaces to identify basic information about the multimedia content and basic information about an intended presentation of the multimedia content;

an act of creating a multimedia presentation object, wherein creating the multimedia presentation object includes the following acts:

an act of determining multimedia content metadata corresponding to a presentation and that identifies how the multimedia content is formatted;

an act of determining a duration for the presentation; and an act of creating an array of stream descriptor objects, wherein the stream descriptor objects include, for each stream in the multimedia content that corresponds to the intended presentation, (a) a unique identifier (b) a start time, (c) a stop time (d) a duration, and (e) all supported media types;

upon creating the multimedia presentation object, an act of creating a new presentation event in a queue;

an act of providing a multimedia stream interface that is enables applications to select and deselect the descriptor objects through function calls, as well as to select desired play rates for the multimedia content at one or more rendering devices, wherein the multimedia stream interface is further configured to assign time stamps to multimedia content that is determined to not already have assigned time stamps;

an act of providing an event manager interface that enables applications to select presentation events through function calls; and upon receiving a function call for the new presentation event from an application, an act of providing the multimedia presentation object to the application, which is used by the application to process the multimedia content.

2. A method as recited in claim 1, further including an act of providing a multimedia presentation interface that is configured to identify basic information about an intended presentation of the multimedia content, wherein the multimedia presentation interface provides the at least one application with the basic information about the intended presentation of the multimedia content.

3. A method as recited in claim 1, further including an act of providing a multimedia stream interface that is configured to allow the at least one application to access the multimedia content in a controlled manner.

4. A method as recited in claim 3, wherein allowing the at least one application to access the multimedia content in a controlled manner includes allowing the application to change the media type of the multimedia content.

5. A method as recited in claim 1, further including an act of providing an event manager interface that is configured to manage multimedia source events and multimedia content events in an event management queue, and wherein the event manager interface is further configured to provide the at least one application with an object in response to receiving an appropriate function call from the at least one application for an event in the event management queue.

6. A method as recited in claim 5, wherein the objects enable the at least one application to process the multimedia content.

7. A method as recited in claim 1, wherein the multimedia interfaces also identify basic information about the multimedia source that includes at least one of information indicating whether the multimedia source is a push source, a pull source or a live source, information regarding the bit rate at which the multimedia source is capable of transmitting data, the formats in which the multimedia source is capable of transmitting the data, the capabilities provided by the multimedia source for seeking and pausing multimedia content, whether the multimedia source includes a clock for time stamping the multimedia content, and whether the multimedia source is capable of transmitting multiple data streams at a single time.

8. A method as recited in claim 1, wherein the method includes receiving a function call from the application for a requested event to enable processing of the multimedia content and wherein the requested event is a multimedia source event or a multimedia content event.

9. A method as recited in claim 8, wherein the requested event is a multimedia source event that includes one of an event indicating that multimedia content has been received by the computing system, an event indicating that a formatting change in the multimedia content has occurred, an event indicating the end of a media stream included in the multimedia content has been reached, an event indicating that a media stream included in the multimedia content is being seeked, and an event indicating the time stamps that are associated with the multimedia content.

10. A method as recited in claim 9, wherein the object associated with the requested multimedia source event includes one of an object identifying the location and attributes of the multimedia content, an object identifying a new format of the multimedia content.

11. A method as recited in claim 8, wherein the requested event is a multimedia content event including one of an event indicating the start or stop of receiving multimedia content from the media source, an event indicating the media source has been seeked for multimedia, an event indicating that a new presentation is available, an events indicating a new stream is available in a current presentation, an event indicating the end of a current presentation, an event indicating that a current presentation has new metadata available, and an event indicating a change in the rate multimedia content is received from the media source.

12. A method as recited in claim 11, wherein the object associated with the requested multimedia content event includes one of an object for activating and deactivating media streams of an intended presentation, an object for identifying the time of multimedia content that is seeked to, an object for starting a new presentation automatically, an object for starting a new presentation after a current presentation has ended, an object for buffering the multimedia content, an object for refreshing a metadata state associated with the presentation.

13. A method as recited in claim 8, wherein the requested event is not present in the event management queue at the time the requested event is requested.

14. A method as recited in claim 13, wherein the method further includes the act of waiting until the requested event is placed in the event queue prior to returning the object associated with the requested event.

15. A method as recited in claim 1, the method further comprising:

an act of providing a multimedia stream interface that is configured to allow the at least one application to access the multimedia content in a controlled manner; and an act of providing an event manager interface that is configured to manage multimedia source events and multimedia content events in an event management queue, and wherein the event manager interface is further configured to provide the at least one application with an object in response to receiving an appropriate function call from the at least one application for an event in the event management queue, wherein the object enables the at least one application to either access or process the multimedia data.

16. A method as recited in claim 1, wherein the multimedia content supports multiple media types, and wherein the method further includes the act of enabling the application to select a preferred media type.

17. A method as recited in claim 16, wherein the multiple media types include audio media types including at least one of WAV, AU, and MIDI audio types.

18. A method as recited in claim 16, wherein the multiple media types include image media types including at least one of JPEG, GIF, and TIFF.

19. A method as recited in claim 16, wherein the multiple media types include media streaming formats including at least one of AVI, ASF, MPEG, MP3, Active Movie, Cinepaq, QuickTime, and Indeo.

20. A computer program product for use in a computing system that is associated with at least one application, the at least one application being configured to process multimedia content from a multimedia source that is associated with the computing system, the computer program product comprising one or more computer-readable media having stored thereon the following:

computer-executable instructions for implementing the method recited in claim 1.

21. The computer program product as recited in claim 20, wherein the one or more computer-readable media include system memory.

22. A computer program product as recited in claim 20, wherein the multimedia content comprises streamed multimedia data.

23. A computer program product as recited in claim 22, wherein the multimedia content includes at least one of audio data and video data.

24. A computer program product as recited in claim 23, wherein the multimedia content includes metadata that is transmitted with the at least one of audio data and video data.

25. A computer program product as recited in claim 20, wherein the computing system accesses the multimedia content from the multimedia source through the Internet.

26. A computer program product as recited in claim 20, wherein the multimedia source includes a DVD.

27. A computer program product as recited in claim 20, further including computer-executable instructions for performing an act of providing a multimedia presentation interface that is configured to identify basic information about an intended presentation of the multimedia content, wherein the multimedia presentation interface provides the at least one application with the basic information about the intended presentation of the multimedia content.

28. A computer program product as recited in claim 20, further including computer-executable instructions for performing an act of providing a multimedia stream interface that is configured to allow the at least one application to access the multimedia content in a controlled manner.

29. A computer program product as recited in claim 20, further including computer-executable instructions for performing an act of providing an event manager interface that is configured to manage multimedia source events and multimedia content events in an event management queue, and wherein the event manager interface is further configured to provide the at least one application with an object upon receiving an appropriate function call from the at least one application for an event in the event queue.

30. A computer program product as recited in claim 20, wherein the basic information includes format agnostic data.

31. A computer program product as recited in claim 20, wherein the basic information includes format specific data.

32. A method as recited in claim 1, wherein the method further includes:

upon creating the multimedia presentation object, an act of queuing an event in an event queue that indicates that a new presentation is ready.

33. A method as recited in claim 1, wherein creation of the presentation object further includes an act of selecting a preferred media type for rendering a corresponding presentation.

34. A method as recited in claim 1, wherein creation of the presentation object further includes an act of synchronizing time stamps of different media streams that are to be rendered simultaneously.

\* \* \* \* \*